United States Patent
Weber

[11] 3,836,249
[45] Sept. 17, 1974

[54] OPTICAL IMAGING SYSTEM OF SHORT FOCAL LENS

[75] Inventor: Paul E. Weber, Libertyville, Ill.

[73] Assignee: Bell & Howell Company, Chicago, Ill.

[22] Filed: Sept. 13, 1972

[21] Appl. No.: 263,388

[52] U.S. Cl. .............................................. 355/51
[51] Int. Cl. ............................................ G03b 27/48
[58] Field of Search ......... 355/50, 51; 350/167, 202

[56] References Cited
UNITED STATES PATENTS
1,490,751  4/1924  Underhill .................... 350/202 X
3,592,542  7/1971  Kaufer .......................... 355/50

FOREIGN PATENTS OR APPLICATIONS
1,203,904  9/1970  Great Britain ................ 355/50

*Primary Examiner*—John M. Horan
*Attorney, Agent, or Firm*—Robert A. Walsh; Gerald B. Epstein

[57] ABSTRACT

An apparatus for forming a continuous image from an object at generally 1:1 magnification with a lens strip optical imaging system having a series of individual optical imaging devices or combinations extending along the length of the strip. The lens strip comprises a solid elongated molded body of transparent plastic material, or the like, with lenslet surfaces and reflecting surfaces of each optical imaging device or combination formed directly on the solid molded elongated strip.

9 Claims, 4 Drawing Figures

PATENTED SEP 17 1974　3,836,249
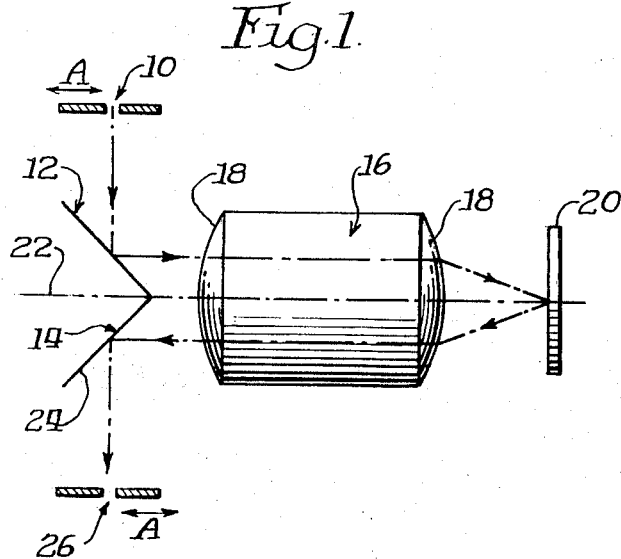
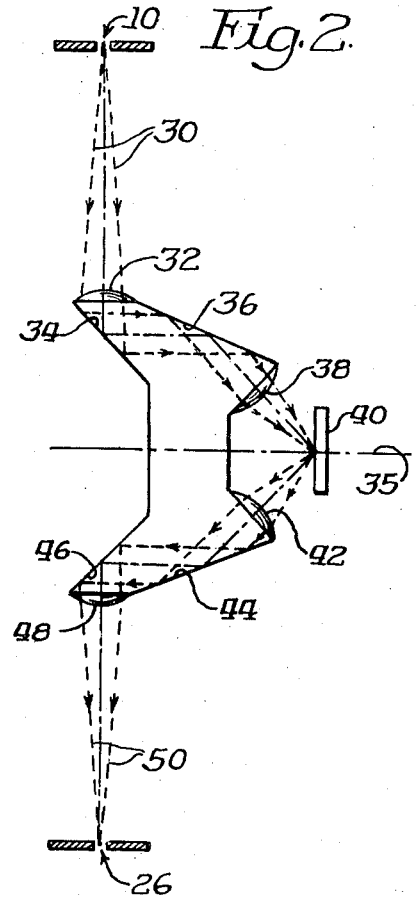
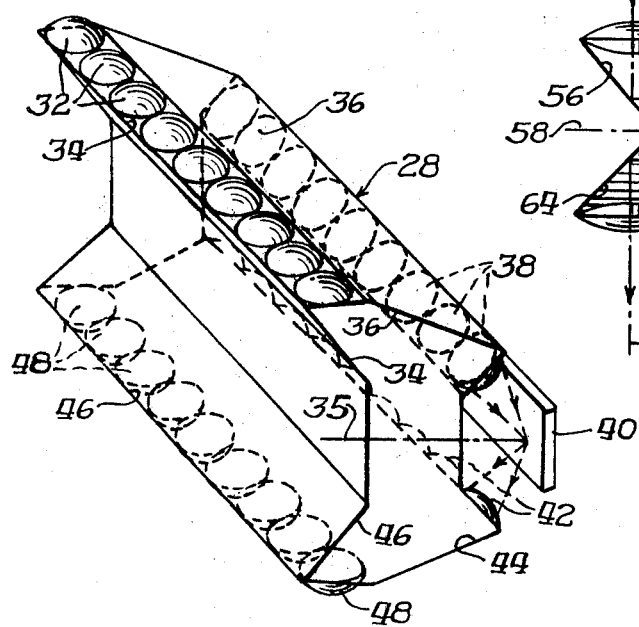
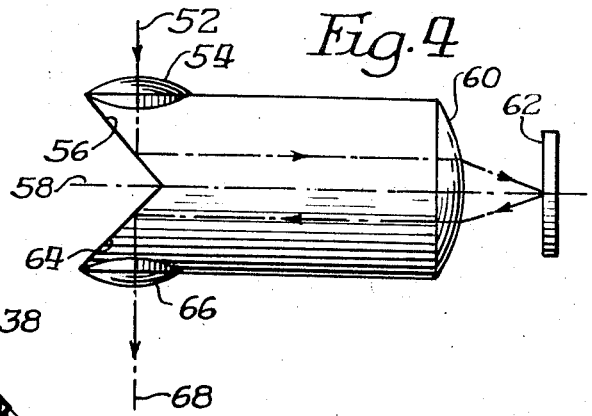

3,836,249

OPTICAL IMAGING SYSTEM OF SHORT FOCAL LENS

BACKGROUND AND SUMMARY OF THE INVENTION

The present invention relates to optical imaging systems and more particularly to an optical imaging system of short focal lengths forming an image at 1:1 magnification with respect to the object viewed.

The invention is particularly directed to optical systems for projecting at unit magnification from an original, such as a document, to a photosensitive sheet in a copying machine.

An object, therefore, of the present invention is to provide a new and improved optical system for utilization in compact copying machines, or the like.

Devices of the character described are known wherein a lens strip optical imaging system is provided having a series of individual optical imaging devices along the length of the lens strip. Such a system is shown in U.S. Pat. No. 3,544,199 to Robert W. Moorhusen, dated Dec. 1, 1970. In known compact copying machines, dihedral reflectors are utilized wherein light from an object is reflected by one face of the dihedral reflector to a reflecting focusing means, or lens, against an external mirror whereupon the light is then reflected back through the focusing lens to the other face of the dihedral reflector and thence into focus to form an image at an image gate. Such arrangements greatly reduce the distance between the object or illumination gate and the image gate. Such systems may be seen with reference to U.S. Pat. No. 3,451,752 to L.F. Frank, dated June 24, 1969, and U.S. Pat. No. 3,364,816 to J.H. Jeffree, dated Jan. 23, 1968.

In the exemplary form of the invention, an elongated solid molded body of transparent plastic material or the like forms a lens strip which is disposed to extend transversely of the direction of movement of the object and sensitized paper. The object to be copied and the sensitized paper normally are disposed in spaced parallel planes at corresponding positions adjacent to but on opposite sides of the lens system axis. With the lens strip of the present invention, the dihedral reflector surfaces and the focusing means, in the form of lenslet surfaces, are formed by the actual surfaces of the molded solid body itself. With such a structure, exterior dihedral reflectors are eliminated which, in turn, eliminates many problems regarding the mounting and spacing of the lenslet surfaces and the reflecting surfaces as well as adjustment thereof to obtain substantial unit magnification.

Other objects, features and advantages of the invention will become apparent from the following detailed description taken in connection with the accompanying drawings.

DESCRIPTION OF THE DRAWINGS

FIG. 1 is a generally schematic view of a dihedral reflector-type imaging device as is known generally in the prior art;

FIG. 2 is an elevational view of one end of the lens strip incorporating the optical imaging system of the present invention;

FIG. 3 is a perspective view of the lens strip of FIG. 2; and

FIG. 4 is an end view of an alternate form of the lens strip.

DETAILED DESCRIPTION OF THE INVENTION

The optical system of the present invention is adapted particularly for copying machines, or the like, wherein an object to be copied at an illuminating station and copy paper at an image station are disposed in spaced parallel planes generally parallel to and on opposite sides of an optical axis therebetween.

FIG. 1 shows generally schematically known dihedral reflector imaging devices or combinations used in compact copying machines wherein light from an object at an illumination gate, generally designated 10, is reflected by one face 12 of a dihedral reflector, generally designated 14, directly to a reflecting focusing means or lens, generally designated 16, having lenslet surfaces 18. The light is projected against a generally planar reflecting mirror 20 which extends generally perpendicular to the lens system axis 22. The light is reflected back from the reflecting mirror 20 through the focusing means 16 and against the other face 24 of the dihedral reflector 14 and thence into focus to form an image on sensitized paper, or the like, at an image gate, generally designated 26. Illumination is provided by appropriate lamps (not shown in the drawings) "inside" the illumination gate 10.

With such prior structures, problems are encountered due to the fact that the dihedral reflector 14, focusing means 16, and external mirror 20 all are individual, separate components which must be appropriately mounted on a supporting framework within the copying machine. Furthermore, such reflectors 14, 20 and imaging means 16 must extend transversely of the lens system axis 22 spanning the width of the object to be copied, between the illumination gate 10 and the image gate 26.

Conventionally, the object at the illumination gate 10 and the copy paper at the image gate 26 move generally in the direction of arrows A (FIG. 1) during the photocopying process and the gates 10 and 26 extend longitudinally generally transversely of said direction of movement.

FIGS. 2 and 3 show one form of the invention wherein a lens strip, generally designated 28 (FIG. 3), is provided and extends transversely generally between the illumination gate 10 and image gate 26. The lens strip is an elongated solid body fabricated of molded transparent plastic material, or the like, with surfaces thereof forming the components of a plurality of optical imaging devices or combinations extending seriatim along the length of the lens strip, as best seen in the perspective view of FIG. 3.

FIG. 2 shows and end view of the lens strip 28 and best illustrates one of the optical imaging devices or combinations which extend along the length of the lens strip. More particularly, light is reflected from an original object at the illumination gate 10, as indicated by the dot-dash lines 30, through a first lenslet surface 32 downwardly against an angularly oriented totally reflecting surface 34. The light is reflected from surface 34 generally horizontally and generally parallel to the lens axis 35 against a second totally reflecting surface 36 which reflects the light at a generally 45° angle downwardly through a second lenslet surface 38 against an exteriorly mounted reflecting mirror 40. The light is reflected back from the mirror 40 through a third lenslet surface 42 and against a third totally reflecting surface 44 formed by the molded lens strip 28. The light then is reflected horizontally from the third reflecting surface 44 against a fourth totally reflecting surface 46 and through a fourth lenslet surface 48. After leaving the fourth lenslet surface 48, the light is projected, as indicated by the dot-dash lines 50, to the image gate 26 where the final image is formed on the sensitized copy paper, the final image being reversed in a right to left direction, as viewed in FIG. 2, but unreversed in the fore and aft direction generally lengthwise of the lens strip 28.

With the lens strip 28 fabricated of transparent molded plastic material, the lenslet surfaces 32, 38, 42 and 48 as well as the reflecting surfaces 34, 36, 44 and 46 all are formed by the outer molded surfaces of the solid unitary plastic body. As best seen in FIG. 3, the lenslet surfaces 32, 38, 42 and 48 extend seriatim along the length of the lens strip 28, and the reflecting surfaces 34, 36, 44 and 46 comprise longitudinally extending surfaces of the solid body of the lens strip.

It is readily apparent that with the structure described above in relation to FIGS. 2 and 3 of the present invention, the unitary body of the lens strip 28 actually forms a framework on which the lenslet surfaces and reflecting surfaces are mounted, simply by their comprising molded surfaces of the solid lens strip. All of the extraneous separate framework pieces, separate dihedral reflectors, and, in some instances, separate and individual lens devices forming the lenslet surfaces of the prior art are eliminated.

FIG. 4 shows an alternate form of the invention for utilizing a solid molded lens strip, as the lens strip 28. The entire lens strip is not illustrated in the drawings. FIG. 4 is similar to FIG. 3 for showing an end view of a lens strip to facilitate the illustration of the individual optical imaging devices or combinations which extend seriatim along the length of the lens strip. In the form of the invention shown in FIG. 4, light, as indicated by the dot-dash lines 52 passes from an illuminating station or gate through a first lenslet surface 54 and against a first totally reflecting surface 56. The light is reflected from the reflecting surface 56 generally horizontally and generally parallel to a lens system axis 58 and through a second lenslet surface 60 against an exteriorly mounted reflecting mirror 62. The light is reflected from the exterior mirror 62 back through the lenslet surface 60 and against a second reflecting surface 64 where the light is reflected through a third lenslet surface 66, in the direction of the dot-dash lines 68, toward an appropriate image station. As with the lens strip 28 of FIGS. 2 and 3, the lenslet surfaces 54, 60 and 66 of the structure shown in FIG. 4 extend seriatim along the length of the lens strip. The reflecting surfaces 56 and 64 actually comprise the dihedral reflector, similarly to that shown in FIG. 1, that is formed by two intersecting surfaces of the lens strip which extend along the length of the strip.

The foregoing detailed description has been given for clearness of understanding only and no unnecessary limitations should be understood therefrom as some modifications will be obvious to those skilled in the art.

I claim:

1. In an optical system for a copying machine or the like wherein an object to be copied at an illuminating station and copy paper at an image station are disposed in spaced parallel planes parallel to and on opposite sides of an optical axis therebetween, the improvement comprising: a unitary lens-reflector assembly including a plurality of optical imaging devices and a plurality of cooperating reflecting devices all of which are formed on a transparent unitary framework, said framework comprising a solid transparent body on which said imaging devices and reflecting devices are mounted, said framework being in proper position for receiving light rays from said object and projecting the rays against an external reflector extending generally perpendicular to and intersecting said optical axis, and said framework being in proper position for receiving the reflected rays from said external reflector and projecting them to the copy paper, said reflecting devices comprise means defining a dihedral reflective surface formed on said body between said illuminating and image stations with at least a projected dihedral edge thereof intersecting said optical axis, wherein light rays from said object pass through one of said imaging devices prior to being reflected by said dihedral reflective surface wherein at least one of said imaging devices is disposed on said body between said dihedral edge of said planar reflecting device.

2. The optical system of claim 1 wherein said framework is fabricated of molded plastic material.

3. The optical system of claim 2 wherein said imaging devices and reflecting devices are formed by external surfaces of the solid molded transparent body.

4. The optical system of claim 1 including a lens strip extending transversely of said optical axis generally between said illuminating station and said image station, with a plurality of lens reflector assemblies extending seriatim along the lens strip.

5. The optical system of claim 4 wherein said imaging devices and reflecting devices are formed by external surfaces of the solid molded transparent body.

6. In an optical system for a copy machine or the like wherein an object to be copied at an illuminating station and copy paper at an image station are disposed in spaced parallel planes parallel to and on opposite sides of an optical axis therebetween, the improvement comprising: a unitary lens-reflector assembly including a plurality of optical imaging devices and a plurality of cooperating reflecting devices all of which are formed on a transparent unitary framework, said framework comprising a solid transparent body on which said imaging devices and reflecting devices are mounted, said framework being in proper position for receiving light rays from said object and projecting the rays against an external reflector extending generally perpendicular to and intersecting said optical axis, and said framework being in proper position for receiving the reflected rays from said external reflector and projecting them to the copy paper, said plurality of optical imaging devices and reflecting devices include a first lens surface on said body through which the light rays pass from said illuminating station generally perpendicular to said axis, a first reflecting surface on said body extending angularly of said axis for reflecting the rays from said first lens surface in a parallel direction to said axis toward said external reflector, a second reflecting surface on said body extending angularly of said axis and perpendicular to said first reflecting surface for reflecting the rays toward said image station, and a second lens surface between said second reflecting surface and said image station.

7. The optical system of claim 6 including lens surface means between said first reflecting surface and said external reflector and between said second reflecting surface and said external reflector.

8. In an optical system for a copying machine or the like wherein an object to be copied at an illuminating station and copy paper at an image station are disposed in spaced parallel planes parallel to and on opposite sides of an optical axis therebetween, the improvement comprising: a unitary lens-reflector assembly including a plurality of optical imaging devices and a plurality of cooperating reflecting devices all of which are formed on a transparent unitary framework, said framework comprising a solid transparent body on which said imaging devices and reflecting devices are mounted, said framework being in proper position for receiving light rays from said object and projecting the rays against an external reflector extending generally perpendicular to and intersecting said optical axis, and said framework being in proper position for receiving the reflected rays from said external reflector and projecting them to the copy paper, said plurality of optical imaging devices and reflecting devices include a first lens surface on said body through which the light rays pass from said illuminating station generally perpendicular to said axis, a first reflecting surface on said body extending angularly of said axis for reflecting the rays from said first lens surface in a parallel direction to said axis toward said planar reflecting device, a second reflecting surface on said body in the path of the rays from said reflecting surface and at an angle to said axis for directing the rays at an angle against said external reflector, a third reflecting surface on said body at an equal but opposite angle to said axis as said second reflecting surface for directing the rays from said planar reflecting device toward a fourth reflecting surface angularly of said axis and perpendicular to said first reflecting surface for directing the rays toward said image station, and a lens surface on said body in line between said fourth reflecting surface and said image station.

9. The optical system of claim 8 including a lens surface on said body in line between said second reflecting surface and said external reflector and a lens surface on said body in line between said external reflector and said third reflecting surface.

* * * * *